(12) United States Patent
Azulai

(10) Patent No.: US 8,494,341 B2
(45) Date of Patent: Jul. 23, 2013

(54) METHOD AND SYSTEM FOR DISPLAY OF A VIDEO FILE

(75) Inventor: Ophir Azulai, Haifa (IL)

(73) Assignee: International Business Machines Corporation, Armonk, NY (US)

(*) Notice: Subject to any disclaimer, the term of this patent is extended or adjusted under 35 U.S.C. 154(b) by 941 days.

(21) Appl. No.: 12/494,294

(22) Filed: Jun. 30, 2009

(65) Prior Publication Data

US 2010/0329634 A1  Dec. 30, 2010

(51) Int. Cl.
*H04N 5/76* (2006.01)

(52) U.S. Cl.
USPC .......................................................... 386/235

(58) Field of Classification Search
USPC ................. 386/201, 230, 235, 239, 248, 353
See application file for complete search history.

(56) References Cited

U.S. PATENT DOCUMENTS

| | | | |
|---|---|---|---|
| 5,504,585 A * | 4/1996 | Fujinami et al. | 386/356 |
| 5,539,465 A * | 7/1996 | Xu et al. | 348/388.1 |
| 5,864,366 A * | 1/1999 | Yeo | 375/240.12 |
| 5,953,074 A * | 9/1999 | Reddy | 348/558 |
| 6,154,771 A | 11/2000 | Rangan et al. | |
| 6,477,315 B1 * | 11/2002 | Ohomori | 386/281 |
| 6,701,528 B1 | 3/2004 | Arsenault et al. | |
| 6,882,793 B1 | 4/2005 | Fu et al. | |
| 2007/0223878 A1 * | 9/2007 | Abe et al. | 386/95 |
| 2007/0266322 A1 | 11/2007 | Tretter et al. | |

OTHER PUBLICATIONS

Delay's Blog, "Video Frame Grabbing Made Easy [How to: Quickly Capture Multiple Video Frames With WPF]", Sep. 2008. http://blogs.msdn.com/delay/archive/2008/09/03/video-frame-grabbing-made-easy-how-to-quickly-capture-multiple-video-frames-with-wpf.aspx.
M. Yachi et al., "An Active Viewing System to Utilize Streaming Video for Education", IEEE 2007 http://ieeexplore.ieee.org/Xplore/login.jsp?url=/iel5/4090056/4090057/04090105.pdf?temp=x.

* cited by examiner

*Primary Examiner* — Tat Chio

(57) ABSTRACT

A method and system for display of a video file are provided in which multiple time segments of the video file are displayed simultaneously to enable small changes to be identified in less time than viewing the entire file in a single playback. The method includes dividing a first portion of a video file into multiple segments each of a same time duration and sending each of the multiple segments of the first portion of the video file to be played simultaneously in multiple windows of a display device. The method then includes dividing a second portion of a video file starting at the end of the first portion, into multiple segments each of a same time duration and sending each of the multiple segments of the second portion of the video file to be played simultaneously in multiple windows of the display device. The method is repeated for subsequent portions until the entire video file has been played.

21 Claims, 4 Drawing Sheets

METHOD AND SYSTEM FOR DISPLAY OF A VIDEO FILE

FIELD OF THE INVENTION

This invention relates to the field of display of a video file. In particular, the invention relates to the simultaneous display of multiple segments of a video file.

BACKGROUND OF THE INVENTION

Video monitoring system record long video footage in which significant events may be short and far apart in time. For example, closed-circuit television (CCTV) is used for surveillance in areas that may need monitoring such as banks, casinos, airports, military installations, and convenience stores and records the same location for a long period of time. In industrial plants, CCTV equipment may be used to observe parts of a process from a central control room when, for example, the environment is not suitable for humans.

A problem arises in that the long video files must be played in order to find an event that occurred. It may take a long time for the viewer to play the video file.

A current solution is to use fast forward whilst scanning the video image. This has the drawback that there is a chance that an event will be missed because of the fast playback and there is a limit on how fast the video can be displayed.

Another solution is to use video analytics. However this involves the use of complex and expensive algorithms.

SUMMARY OF THE INVENTION

According to a first aspect of the present invention there is provided a method for display of a video file, comprising: dividing a first portion of a video file into multiple segments each of a same time duration; sending each of the multiple segments of the first portion of the video file to be played simultaneously in multiple windows of a display device; dividing a second portion of a video file starting at the end of the first portion, into multiple segments each of a same time duration; sending each of the multiple segments of the second portion of the video file to be played simultaneously in multiple windows of the display device; repeating the method for subsequent portions until the entire video file has been played; wherein any of said steps are implemented in either of computer hardware or computer software and embodied in a computer-readable medium.

According to a second aspect of the present invention there is provided a computer program product for display of a video file, the computer program product comprising: a computer readable medium; computer program instructions operative to: divide a first portion of a video file into multiple segments each of a same time duration; send each of the multiple segments of the first portion of the video file to be played simultaneously in multiple windows of a display device; divide a second portion of a video file starting at the end of the first portion, into multiple segments each of a same time duration; send each of the multiple segments of the second portion of the video file to be played simultaneously in multiple windows of the display device; repeat the method for subsequent portions until the entire video file has been played; wherein said program instructions are stored on said computer readable medium.

According to a third aspect of the present invention there is provided a method of providing a service to a customer over a network to display a video file, the service comprising: dividing a first portion of a video file into multiple segments each of a same time duration; sending each of the multiple segments of the first portion of the video file to be played simultaneously in multiple windows of a display device; dividing a second portion of a video file starting at the end of the first portion, into multiple segments each of a same time duration; sending each of the multiple segments of the second portion of the video file to be played simultaneously in multiple windows of the display device; repeating the method for subsequent portions until the entire video file has been played; wherein any of said steps are implemented in either of computer hardware or computer software and embodied in a computer-readable medium.

According to a fourth aspect of the present invention there is provided a system for displaying a video file, comprising: a processor; a divider module for dividing sequential portions of a video file into multiple segments each segment of a same time duration; a streamer for sending each of the multiple segments of a portion of the video file to be played simultaneously in multiple windows of a display device; a timer for sending a next portion's segments for simultaneous display after the time duration of a segment has lapsed; wherein any of said divider module, streamer, and timer are implemented in either of computer hardware or computer software and embodied in a computer readable medium.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system are described in which multiple time segments of the same video file are displayed in parallel. A video file is divided into segments with a time shift between segments. A number of the consecutive segments are displayed simultaneously. After a time of the time shift has passed, each display forwards to an amount of the time shift multiplied by the number of displayed segments. This is repeated after each time shift.

In this way, multiple displays of consecutive segments of the video are displayed and the video file is jumped to the next consecutive segments until the video file is finished. This enables, short or small changes in the video image to be noticed by a viewer due to the comparison between the segments. The human eye is sensitive to relative changes across multiple images.

The overall picture of the video file may be constant (for example, a fixed CCTV camera, or sensor camera) or may change gradually (for example, in aerial monitoring or moving CCTV). Events in which an abrupt change in the video need to be identified and such events may be very short in duration making them difficult to observe when watching the video file.

Figure 1:
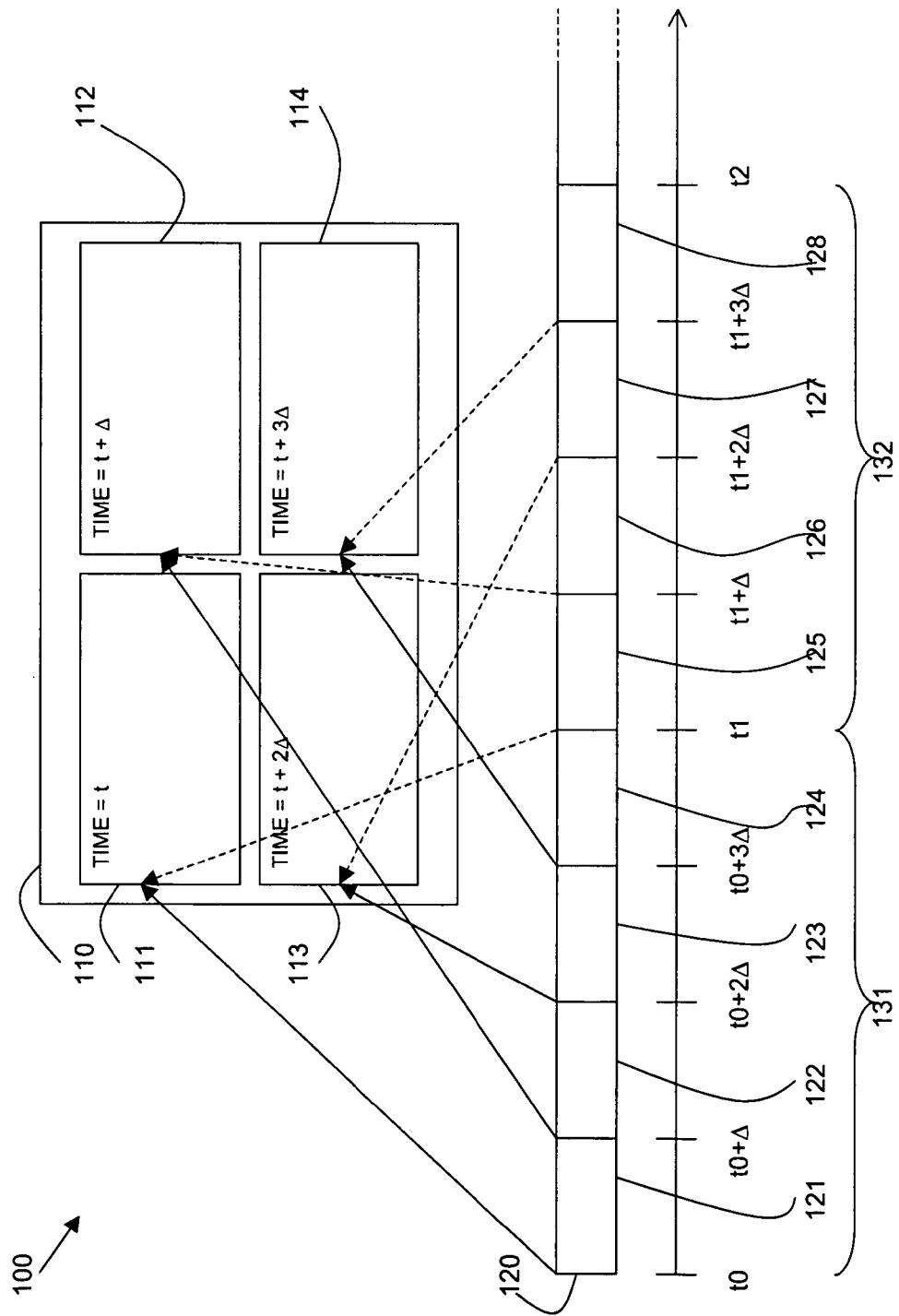
FIG. 1 is a schematic diagram of a display of a video in accordance with the present invention.

Referring to FIG. 1, a schematic diagram 100 shows an example embodiment of a display 110 comprising multiple display windows 111-114 each displaying a segment of a video file 120. In the illustrated display there are four windows 111-114; however, any number of windows could be displayed depending on the size and resolution of the overall display 110.

The video file 120 is divided into segments 121-128 of length $\Delta$. A first segment 121 starting at t0 121 is displayed in a first display window 111. A second segment 122 starting at t+$\Delta$ is displayed in a second window 112. A third segment 123 starting at t0+2$\Delta$ is displayed in a third window 113. A fourth segment 124 starting at t0+3$\Delta$ is displayed in a fourth window 114.

After time $\Delta$ has lapsed and the video segments 121-124 have been displayed on the four display windows 111-114 simultaneously, the video file 120 jumps by a time N$\Delta$ from the start time, in this case 4$\Delta$ (or (N−1)$\Delta$ from the finish time of the previously displayed segments). This results in a fifth segment 125 starting at t1 (=t0+4$\Delta$) being displayed in the first display window 111. A sixth segment 126 starting at t1+$\Delta$ is displayed in the second window 112. A seventh segment 127 starting at t1+2$\Delta$ is displayed in the third window 113. An eighth segment 128 starting at t1+3$\Delta$ is displayed in the fourth window 114.

After a further time $\Delta$ has lapsed and the video segments 125-128 have been displayed on the four display windows 111-114 simultaneously, the video file 120 jumps by a time N$\Delta$ from the start of the previous segments, in this case 4$\Delta$ (or (N−1)$\Delta$ from the finish time of the previously displayed segments). The next four segments are then displayed. This continues until the video file 120 has all been displayed.

Each of N windows displays segments starting at t, t+$\Delta$, t+2$\Delta$, t+3$\Delta$ . . . t+N$\Delta$ respectively. Where t=t0, t1, t2 . . . .

The video file 120 can be considered to be divided into portions 131, 132, each of length N$\Delta$, with the same positioned segment in each portion 131, 132 being displayed in the same window 111-114.

Figure 2:
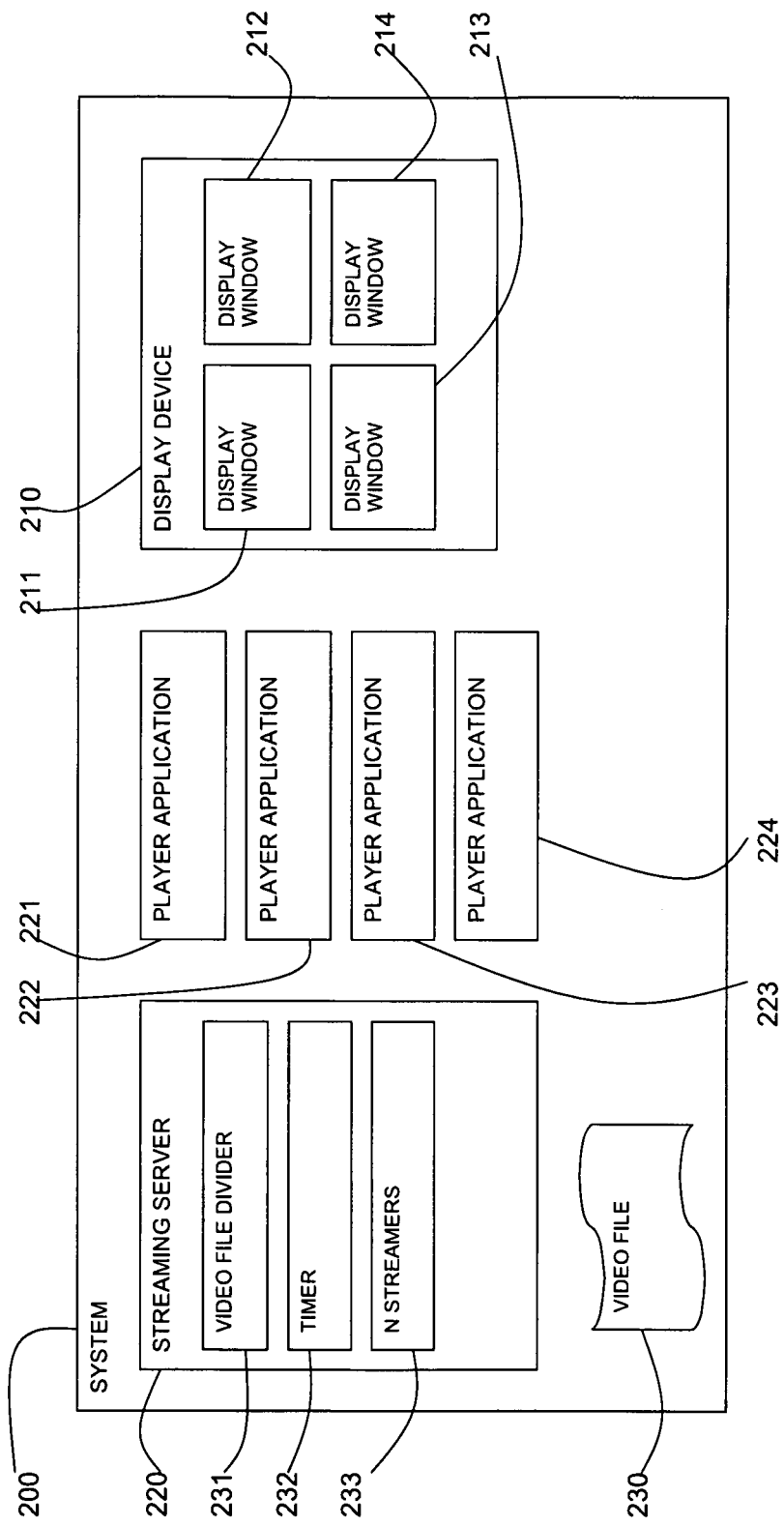
FIG. 2 is a block diagram of a system in accordance with the present invention.

Referring to FIG. 2, a block diagram shows a described system 200. The system 200 includes a display device 210 with multiple display windows 211-214. The display device 210 may have a single screen on which the multiple display windows 211-214 are displayed in a non-overlapping arrangement. Alternatively, the display device 210 may have multiple screens for displaying one or more of the display windows 211-214. Any number of multiple display windows 211-214 may be provided and four are illustrated here as an example.

The system includes a streaming server 220 and multiple player applications 221-224. The number of player applications 221-224 corresponds to the number of display windows 211-214 being shown. The player applications 221-224 may display their playback on display windows 211-214 on different parts of the display device's screen, or on different screens.

The streaming server 220 accesses a video file 230 to be played. The streaming server 220 includes a video file divider 231, a timer 232, and a streamer 233 for streaming into N streams (or N streamers). The streaming server 220 divides the video file 230 and streams or sends the segments of the video file 230 to different ports for different player applications 221-224 for display on different display windows 211-214. The timer 232 times when the next set of segments must be sent to the player applications 221-224.

The streaming server 220 may be separate from the player applications 221-224 and display device 210 and may divide and stream a video file 230 remotely.

Figure 3:
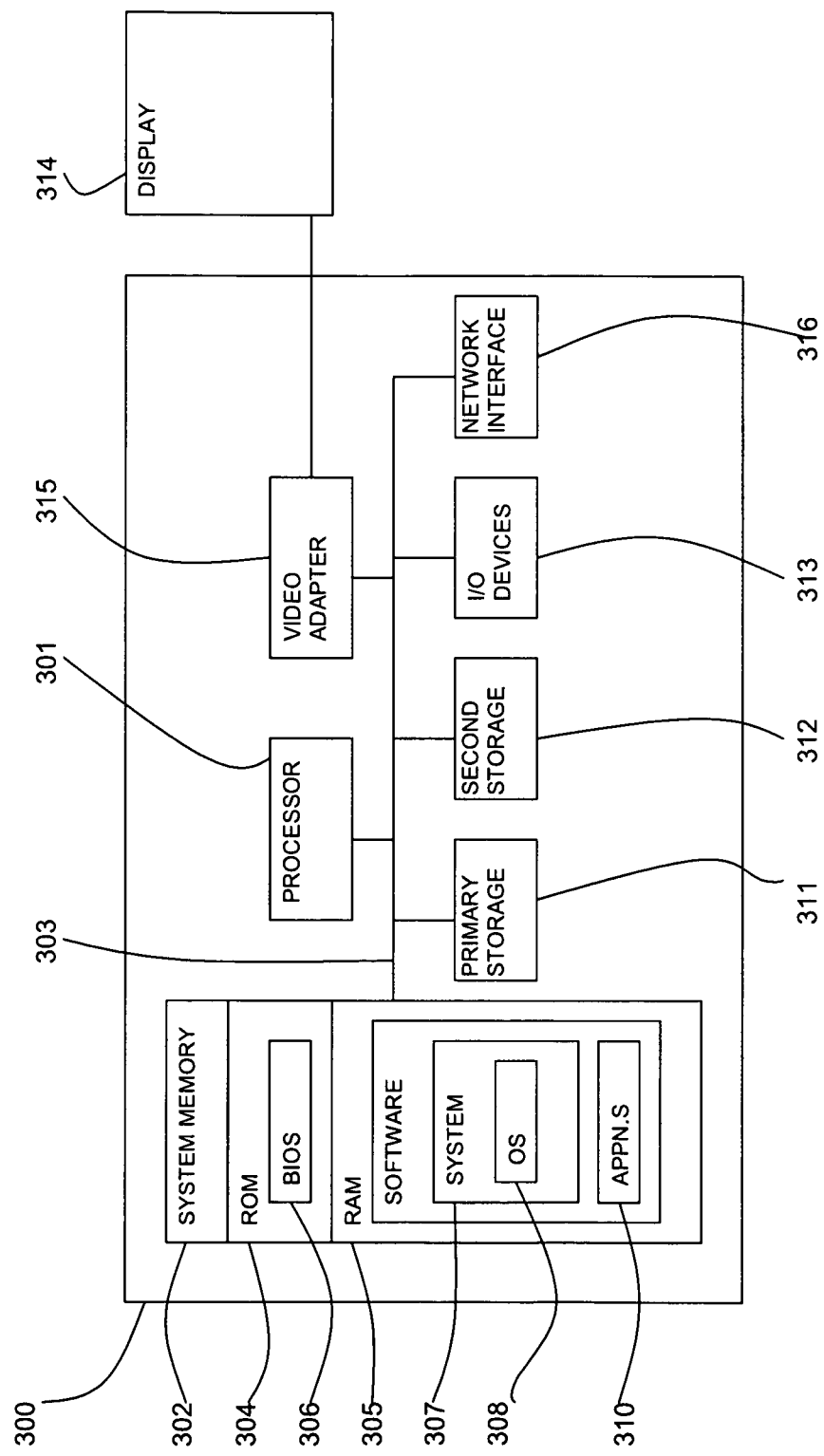
FIG. 3 is a block diagram of a computer system in which the present invention may be implemented.

Referring to FIG. 3, an exemplary system for implementing the system of FIG. 2 includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
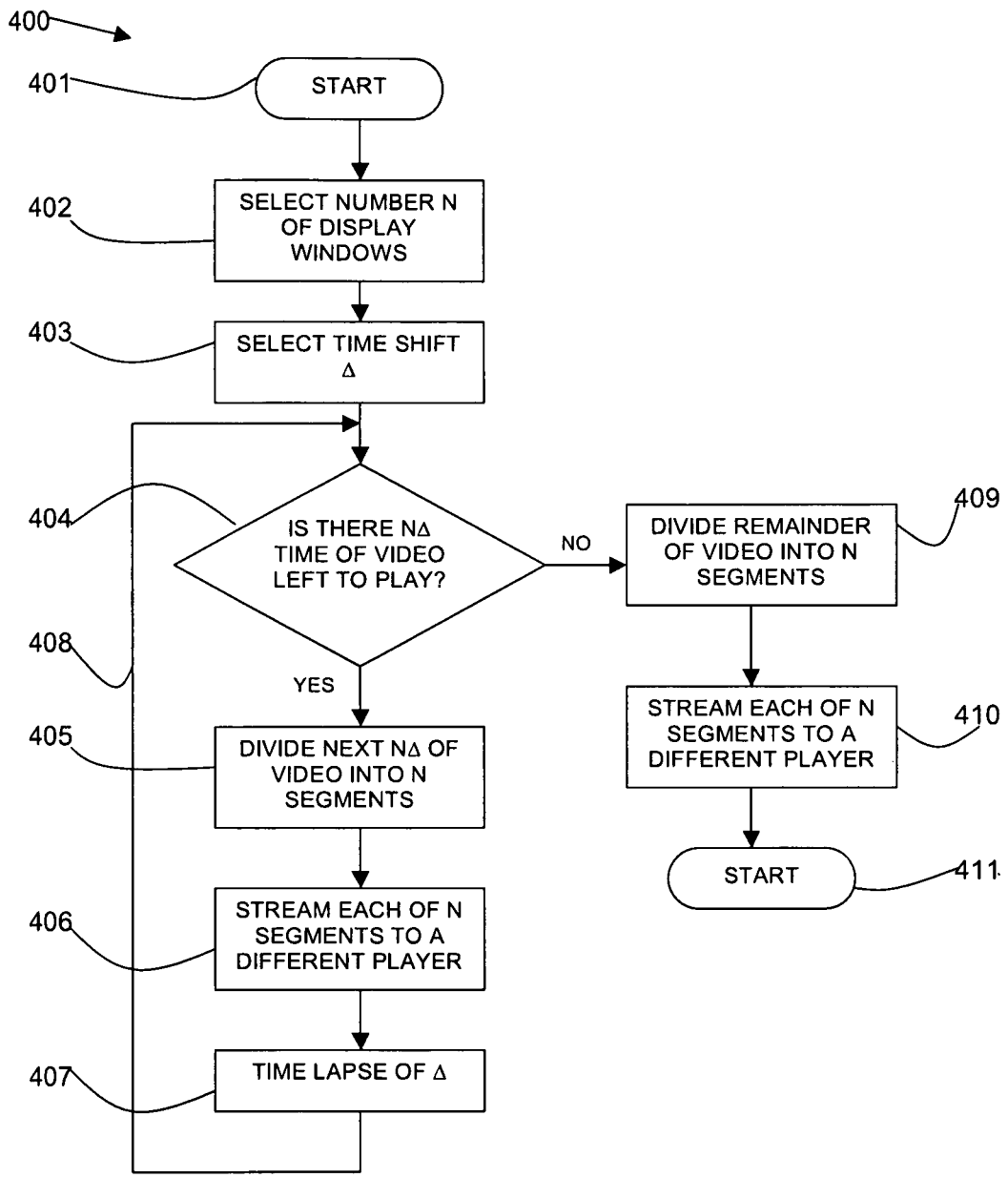
FIG. 4 is a flow diagram of a method in accordance with the present invention.

Referring to FIG. 4, a flow diagram 400 shows a process which starts 401 and a number N of display windows is selected 402 and a time shift $\Delta$ is selected 403.

It is determined 404 if there is N$\Delta$ time of video file left to play. If so, the next N$\Delta$ of video is divided 405 into N segments. Each of the N segments are streamed 406 to a different player for display in individual windows.

Each streamer may independently seek to the next segment (N*$\Delta$ ahead) automatically, assuming the timer is common to the N streamers.

The time $\Delta$ is timed 407 and the process loops 408 to determine 404 if there is N$\Delta$ time of video left to play. If there is not N$\Delta$ time of video left to play, the remaining video time is divided 409 into N segments. Each of the N segments is streamed 410 to a player for display in a window. The process then ends 411 as the entire video file has been played.

A user looks for a short event in each display. Due to the display of the different time segments in close proximity to each other, multiple time segments can be scanned by a user simultaneously. This decreases the time taken for a video file to be viewed.

In video, a Group of Pictures (GOP) refers to a fixed number of video frames which begins with an Intra frame (an I frame). Regular sizes for a GOP are 12 or 15 frames. The time between segments in the described method and system (Δ) may be an integer number of GOPs.

In the server side, there are N streaming sessions which all start the streaming at a different segment at the same time. Each streaming session starts streaming a segment from a GOP boundary. It plays for Δ time and then seeks forward for N*Δ and starts streaming again. When a streaming session starts streaming the second segment, it must change on the fly the video timestamps so it will be continuous between segments.

A streaming server may be provided as a service to a customer over a network.

It is reasonable to user the described method when the original video file's resolution is much lower than the display screen's resolution. This means that multiple video segments in the original resolution can be displayed on one screen. In another embodiment, the multiple video segments can be displayed on several screens or the video players can resize or resample the incoming video so that it fits to the screen.

The described method and system may be applied to CCTV, unmanned aerial vehicle (UAV), and other monitoring video footage. The described method and system may be used for aerial monitoring. The video footage may be of a static location or of a gradually changing scene. The described method and system enable identification of a short event in a video file in less time than it takes to view the entire video file on a single player.

The invention can take the form of an entirely hardware embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for display of a video file, comprising:
   dividing a first portion of a video file into multiple segments of consecutive frames of the first portion, each of a same time duration;
   sending each of the multiple segments of consecutive frames of the first portion of the video file to be played simultaneously in multiple windows of a display device;
   dividing a second portion of a video file starting at the end of the first portion, into multiple segments each of a same time duration;
   sending each of the multiple segments of the second portion of the video file to be played simultaneously in multiple windows of the display device;
   repeating the method for subsequent portions until the entire video file has been played,
   wherein any of said steps are executed by a computer processor,
   wherein each one of the segments contains all frames presented in its respective portion along its respective duration, and wherein all segments of a common portion are consecutive and displayed simultaneously so that the displayed segments are spatially adjacent; and
   wherein in dividing the second video portion of the video file into multiple segments, the processor determines whether the video file includes remaining un-displayed content of a duration of at least the number of multiple windows times the same time duration of the segments, if the answer is positive divides the portion into segments of the length of the same time duration and if the answer is negative the remaining un-displayed content of the video file is divided in a manner taking into account the duration of the remaining un-displayed content.

2. The method as claimed in claim 1, wherein a first segment of each portion of a video file is sent to be played in a given window of the display device.

3. The method as claimed in claim 2, wherein each subsequently placed segment of each portion of a video file is sent to be played in a given window of the display device.

4. The method as claimed in claim 1, wherein there are a set number N of windows of a display device and the first and second portions are divided into the number N segments.

5. The method as claimed in claim 1, wherein the time duration of the multiple segments is constant throughout the method until a remaining portion of a video file is divided into multiple segments each of the same remaining duration.

6. The method as claimed in claim 1, wherein playing each of the multiple segments streams each of the multiple segments to a separate player application.

7. The method as claimed in claim 1, wherein the multiple windows of the display device are adjacent each other.

8. The method as claimed in claim 1, wherein the multiple windows are displayed in multiple screens of a display device.

9. The method as claimed in claim 1, wherein the video segments simultaneously played in the multiple windows of the display device are viewed to identify an event in the video file.

10. The method as claimed in claim 1, wherein a video file resolution is lower than a display resolution enabling multiple video segments to be played in their original resolution.

11. The method as claimed in claim 1, wherein the time duration of segments is an integer number of a group of pictures and starts with an intra frame.

12. The method as claimed in claim 1, wherein dividing the remaining un-displayed content of the video file in a manner taking into account the duration of the remaining un-displayed content comprises dividing into a number of segments equal to the number of multiple windows.

13. A computer program product for display of a video file, the computer program product comprising:
a computer readable non transitory medium having computer readable program embodied therewith, the computer readable program comprising:
computer readable program configured to divide a first portion of a video file into multiple segments of consecutive frames of the first portion, each of a same time duration;
computer readable program configured to send each of the multiple segments of consecutive frames of the first portion of the video file to be played simultaneously in multiple windows of a display device;
computer readable program configured to divide a second portion of a video file starting at the end of the first portion, into multiple segments each of a same time duration;
computer readable program configured to send each of the multiple segments of the second portion of the video file to be played simultaneously in multiple windows of the display device; and
computer readable program configured to repeat the method for subsequent portions until the entire video file has been played,
wherein each one of the segments contains all frames presented in its respective portion along its respective duration, and wherein all segments of a common portion are consecutive and displayed simultaneously so that the displayed segments are spatially adjacent, and
wherein in dividing the second video portion of the video file into multiple segments, the program determines whether the video file includes remaining un-displayed content of a duration of at least the number of multiple windows times the same time duration of the segments, if the answer is positive divides the portion into segments of the length of the same time duration and if the answer is negative the remaining un-displayed content of the video file is divided in a manner taking into account the duration of the remaining un-displayed content.

14. A system for displaying a video file, comprising:
an input device adapted to receive a video file;
an output interface configured to send video files to display windows; and
a computer processor configured to receive a video file, to divide the video file into a plurality of portions of consecutive frames in the video file, to divide each portion into multiple segments of consecutive frames in the portion of the video file, such that the segments have a same duration and to send the multiple segments to be played simultaneously in multiple windows of a display device,
wherein in dividing the portions of the video file into multiple segments, the processor determines whether the video file includes remaining un-displayed content of a duration of at least the number of multiple windows times the same time duration of the segments, if the answer is positive divides the portion into segments of the length of the same time duration and if the answer is negative the remaining un-displayed content of the video file is divided in a manner taking into account the duration of the remaining un-displayed content.

15. The system as claimed in claim 14, wherein the time duration of the multiple segments is constant until a remaining portion of the video file is divided into multiple segments each of the same remaining duration.

16. The system as claimed in claim 14, wherein the computer processor sends each of the multiple segments to a separate player application.

17. The system as claimed in claim 14, wherein the multiple windows of the display device are adjacent each other on a single screen.

18. The system as claimed in claim 14, wherein the multiple windows of the display device are on different screens of a display device.

19. The system as claimed in claim 14, wherein a video file resolution is lower than a display device's resolution enabling multiple video segments to be played in their original resolution.

20. The system as claimed in claim 14, wherein the time duration of segments is an integer number of a group of pictures and starts with an intra frame.

21. A method for display of a video file, comprising:
receiving a video file for display on a display device;
dividing the video file into a plurality of portions of consecutive frames in the video file, by a computer processor;
for each portion of the video file, dividing the portion into multiple segments of consecutive frames in the portion of the video file, such that the segments have a same duration; and
sending the multiple segments to be played simultaneously in multiple windows of a display device,
wherein in dividing the portions of the video file into multiple segments, the processor determines whether the video file includes remaining un-displayed content of a duration of at least the number of multiple windows times the same time duration of the segments, if the answer is positive divides the portion into segments of the length of the same time duration and if the answer is negative the remaining un-displayed content of the video file is divided in a manner taking into account the duration of the remaining un-displayed content.

* * * * *